United States Patent [19]

Mills

[11] Patent Number: 4,624,332

[45] Date of Patent: Nov. 25, 1986

[54] SPECIAL PURPOSE SCALE

[75] Inventor: Richard P. Mills, Ft. Atkinson, Wis.

[73] Assignee: The Dow Chemical Company, Midland, Mich.

[21] Appl. No.: 677,268

[22] Filed: Dec. 3, 1984

[51] Int. Cl.[4] .......................... G01G 1/02; G01G 1/28
[52] U.S. Cl. .................................... 177/224; 177/216; 177/235
[58] Field of Search ................. 177/216, 224, 235, 245

[56] References Cited

U.S. PATENT DOCUMENTS

| | | | |
|---|---|---|---|
| 601,224 | 3/1898 | Eaton | 177/245 |
| 2,060,064 | 11/1936 | Fryer | 177/216 |
| 2,646,979 | 7/1953 | Weber | 177/245 X |
| 3,454,120 | 7/1969 | Peterson | 177/235 X |
| 3,599,738 | 8/1971 | Wickenberg | 177/216 X |

FOREIGN PATENT DOCUMENTS 17126 of 1915 United Kingdom ................ 177/216

Primary Examiner—E. A. Goldberg
Assistant Examiner—Patrick W. Foster
Attorney, Agent, or Firm—Robert M. Wolters

[57] ABSTRACT

A balance-type scale is provided which is made nearly substantially entirely of plastic, thereby being resistant to environmental degradation. A counter-balance weight is of metal, but is embedded within the plastic. The scale is of two-part construction, comprising a body including the counter weight and a hook-like structure at the opposite end. A suspension member is pivotally connected to the body, and comprises a pair of spaced plates embracing the body. The suspension member includes a pointer, and the body is provided with indicia to be read opposite the pointer and readable directly in units of weight.

4 Claims, 6 Drawing Figures

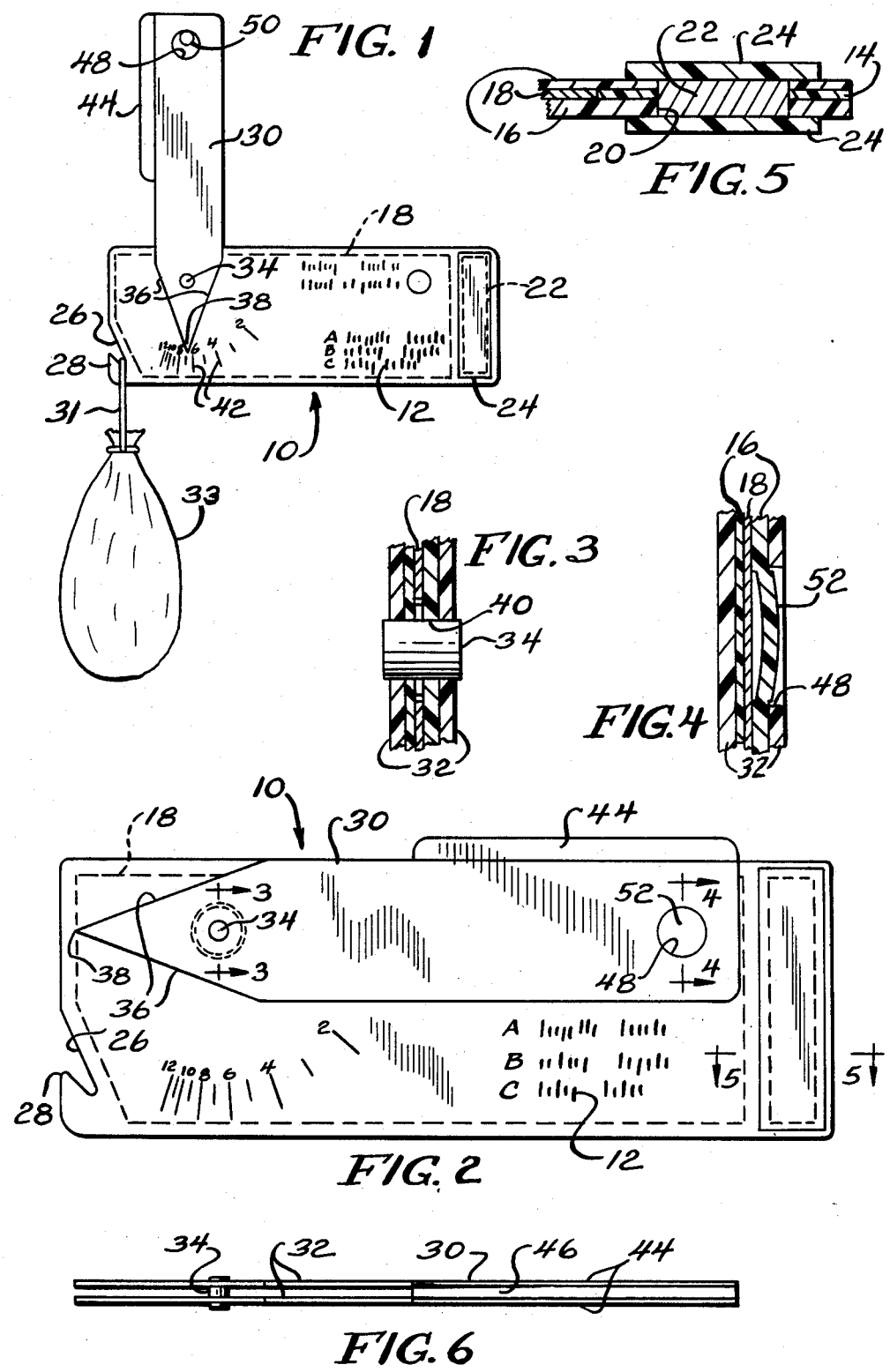

SPECIAL PURPOSE SCALE

BACKGROUND OF THE INVENTION

Special purpose scales for weighing materials within a given range of weights are sometimes required, and it is necessary for the weight to be measured carefully. For example, it may become desirable to meter pesticide or the like quite accurately in the planting of various agricultural products such as corn. In such instance it is essential that a certain amount of pesticide be applied to be adequately effective. On the other hand, too much pesticide applied is wasteful and can have deleterious effects.

Scales using springs are often unacceptable, and particularly for agricultural field use. Moisture, dirt, and chemicals can quickly render spring-type scales highly inaccurate and unacceptable for use in weighing pesticides and other substances to be used for agriculture.

OBJECTS AND BRIEF SUMMARY OF THE PRESENT INVENTION

It is an object of the present invention to provide a balance-type scale which is substantially environmentally impervious, and which is operable accurately over a given weight range for weighing products, specifically products for use in agriculture such as pesticides.

More particularly, it is an object of the present invention to provide a balance-type scale made substantially entirely of plastic and incorporating a metal counterweight which is embedded within the plastic and hence sealed from the environment.

A further object of the present invention is to provide a balance-type scale for use over a given range, and which is small and readily carried in a pocket.

In attaining the foregoing and other objects, I have provided a balance-type scale made mainly of a suitable resinous plastic material and substantially rectangular in outline. A plastic suspension member is pivotally connected by a plastic pivot to the body of the scale, and is provided at its lower end with a pointer for cooperation with a calibrated scale on the body. The pivot is relatively adjacent the upper edge and one end of the body, and a hook is formed in the adjacent end of the body for receipt of a cord or the like for suspending a container with a quantity of material to be weighed. Metal weight means are embedded within the opposite end of the body. The suspension member is pivotable into alignment with the body of the scale, and has an aperture adjacent the end opposite the pointer which normally is used for supporting the suspension member, which aperture is also cooperable with a protuberance on the body of the scale to hold the suspension member in position adjacent the body for storage and transportation.

THE DRAWINGS

The invention will best be understood from the following specification when taken in connection with the accompanying drawings wherein:

FIG. 1 is a front view of a scale constructed in accordance with the present invention;

FIG. 2 is an enlarged front view of the scale as folded for storage or transportation;

FIG. 3 is a further enlarged partial cross sectional view along the line 3—3 in FIG. 2;

FIG. 4 is an enlarged partial cross sectional view along the line 4—4 in FIG. 2;

FIG. 5 is an enlarged partial cross sectional view along the line 5—5 in FIG. 2; and FIG. 6 is a detail view of the suspension member forming a part of the scale.

DETAILED DISCLOSURE OF THE ILLUSTRATED EMBODIMENT

Referring now in greater particularity to the drawings, there will be seen a scale 10 constructed in accordance with the principles of the present invention and including a generally rectangular body 12, preferably having rounded corners. The body 12 is constructed of a suitable resinous plastic material such as a polyvinylchloride, polystyrene, polyacrylate, polymethacrylate or polycarbonate resin, and is of laminated construction, including a peripheral spacer 14 and a pair of face pieces 16. The face pieces and the spacer are made of transparent plastic, and preferably the entire body is transparent. The spacer and face pieces are preferably adhesively secured, as by a solvent-type adhesive, and a piece of paper or the like 18 is provided within the spacer and between the face pieces, and bearing a legend with directions for use. The paper may be of one or two thicknesses for printing on opposite surfaces.

At the right end of the body, as viewed in FIGS. 1 and 2, the body is recessed at 20 to receive an embedded metallic counter-weight 22, FIG. 5, which is covered by rectangular plastic pieces 24 which protrude from and are adhesively secured to the opposite surfaces of the body by means such as a solvent-type adhesive.

At the opposite end of the body from the counter-weight 22 and relatively toward the bottom edge thereof there is a diagonally inwardly and downwardly directed notch or recess 26 terminating in a hook 28. In use, a cord 31 may be looped over the hook and used to suspend a bag 33 of pesticide or other desired product.

A suspension member 30 for the scale comprises two similarly shaped plates 32, FIG. 3, respectively lying on opposite sides of the body 12 and pivotally mounted thereon by means of a pivot pin 34. The suspension member 30 is elongated, although not quite as long as the body 12, and is of generally rectangular outline, having converging edges adjacent the bottom or left end (FIG. 2) thereof as shown at 36 leading to a point 38. The pivot pin 34 is within the tapered portion 36 of the suspension member and is secured to at least one of the side plates 32, by means such as an adhesive, preferably a solvent-type adhesive. The pin 34 extends pivotally through a hole 40 in the body 12. The pivot pin passes through the body relatively adjacent the left end thereof as seen in FIG. 1, and relatively adjacent the top edge. The disposition of the pivot pin relative to the body and to the suspension member 30 is such that with the parts folded as in FIG. 2 the point 38 does not quite reach the left end of the body 12. With the suspension member in the erect position as shown in FIG. 1 the point is in close proximity to an arcuate array of calibrated scale markings or indicia 42. These may be imprinted on the paper sheet 18 or on the front face piece 16, or both.

Each of the suspension member side plates 32 is provided along the left edge near the upper portion thereof (as viewed in FIG. 1) with a substantially rectangular extension 44 which is relatively narrow. The outer corners of each extension preferably are rounded, as shown. A spacer 46 fits between and is adhesively secured to the extensions 44, again preferably by means of a solvent adhesive. The spacer forms a unitary structure with the side plates 32, and it also provides a positive stop limiting clockwise pivoting of the suspension member 30 into substantially aligned position relative to the body 12 as viewed in FIG. 2.

A circular aperture 48, FIGS. 2 and 4, extends through each of the side plates 32, the apertures being in alignment. The apertures are located on the longitudinal center line of the suspension member (not counting the extensions 44), as is the pivot pin 34. The apertures 48 are sufficiently large that in use a cylindrical object 50 such as a pen or pencil, or a screwdriver, can be inserted through the aligned apertures to support the suspension member with essentially line contact, thereby substantially eliminating friction as a factor in the orientation of the suspension member 30. A shallow domed protuberance 52, FIG. 4, is provided on the front surface of the body 12 for cooperation with the respective aperture 48 resiliently to hold the suspension member in aligned or storage position relative to the body as shown in FIG. 2. The protuberance may be an integral protuberance heat formed in the front face of the body 12 before it is adhesively secured to the spacer, or it may be a separate piece adhesively secured to the front face of face piece 16. The side plates 32 of the suspension member 30 embrace the body loosely so as to avoid frictional binding therewith. However, the protuberance 52 extends outwardly and into the aperture 48 of the front plate 32 of the suspension member a sufficient distance that the plate has to be flexed outwardly slightly to pass over or unlocked from the protuberance. It is contemplated that there could be two aligned protuberances 52 respectively on the front and back faces of the body, but it has been found that a single protuberance is sufficient.

In the use of the structure, when it is desired to weigh an object, for example a bag containing a product useful in agriculture, such as an insecticide (it could equally well be any other product such as a pesticide, e.g. a herbicide or other agriculturally useful product) the suspension member 30 is manually supported by means such as a pencil or screwdriver 50 with the suspension member in substantially upright position, as viewed in FIG. 1. Since the notch 26 is spaced horizontally from the pivot pin 34 a much lesser distance than is the counter-weight 22, the item being weighed can have a weight substantially in excess of the total weight of the counter-weight 22. Depending on just what the weight being measured is, the body 12 will tip one way or the other from horizontal position, relative to the suspension member 30. The result is that the pointer tip 38 will cooperate with the indicia 42 so that the weight can be read directly.

The entire structure, except for the weight 22, is made of plastic, and the weight although made of metal, is embedded within the plastic. Accordingly, the scale is not subject to any substantial degradation by the environment in which it is operated, including pesticides or the like, which combined with moisture can be quite corrosive to metal parts. The scale can be readily rinsed off under a faucet or the like to remove dirt or dust that might tend to impede proper pivoting movement. Since the suspension member 30 and the body 12 can be pivoted into overlapping, contiguous relation, the scale can readily be carried in the user's pocket to a farm site or the like where it would be used. In one specific example the body 12 may be about 8½ inches long and about 3 inches high, while the suspension member 30 may be 7½ inches long and about 1½ inches wide exclusive of the extensions 44. As will be appreciated, an item to be weighed, such as the bag 32 of pesticide or the like may be weighed initially, and then weighed after a certain amount of pesticide has been distributed. The weight of the distributed pesticide then is readily reached by simple subtraction.

The scale can also be used for calibrating a product dispenser. A desired setting may for example be established on each hopper of a planter from which insecticide or the like is to be dispensed, and the planter then runs over a measured distance in the field where the insecticide is to be dispensed. A bag, such as the bag 33, may be attached to each tube or hopper outlet to collect the insecticide dispensed, over the measured distance. Each bag may then be weighed on the scale of the present invention, and the accuracy of the quantity of insecticide dispensed from each hopper is then known. The hopper outlets can then be reset as necessary to insure accuracy in the amount of insecticide dispensed.

The specific example of the invention as herein shown and described is for purposes of illustration only. Various changes will no doubt occur to those skilled in the art, and will be understood as forming a part of the present invention insofar as they fall within the spirit and scope of the appended claims.

The invention is claimed as follows:

1. A balance-type scale comprising a relatively elongated substantially flat body of resinous plastic material having front and back faces and a first end and a second end, means adjacent said first end for supporting a subject to be weighed, weight means of preselected mass embedded within said plastic material adjacent to said second end for counter-balancing a subject to be weighed, a substantially rigid suspension member of resinous plastic material, means relatively adjacent said first end of said body for pivotally supporting said body from said suspension member, said suspension member having like front and back spaced apart plates spaced apart by a spacer and respectively lying adjacent said front and back faces and said supporting means engaging and being embraced by both plates, said suspension member and said body having cooperating pointer and indicia means thereon for mutual cooperation to indicate the weight of the subject being weighed, said plates having aligned holes therein through which an object such as a pencil may extend to support said suspension member, at least one face of said body having a protuberance thereon for receipt in one of said holes when said suspension member is pivoted into substantially aligned position with said body to retain said suspension member in said substantially aligned position.

2. A scale as set forth in claim 1 wherein the suspension member side plates are pivotable into aligned position with said body, said side plates having extensions thereon projecting beyond said body when the side plates are so aligned, and wherein said spacer is disposed between said extensions.

3. A balance-type scale comprising a substantially rectangular, relatively elongated substantially flat body of resinous plastic having front and back faces and a first end and a second end, an edge opening notch in said first end extending downwardly and inwardly in said body and defining a hook for supporting a subject to be weighed, weight means adjacent said second end for counter-balancing a subject to be weighed and embedded within said resinous plastic, an elongated suspension member of resinous plastic material having a first end and a second end, said first end tapering substantially to a point, means relatively adjacent said first end of said body for pivotally supporting said body from said suspension member, said body having indicia thereon cooperable with said suspension member point for indicating the weight of the subject being weighed, said suspension member including like front and back plates spaced apart and respectively lying adjacent said front and back faces and embracing said body, said supporting means engaging both of said suspension member plates, said plates having lateral extensions thereon, and said plates being pivotable into substantial alignment with said body except for said extensions, a spacer extending between said extensions and fixed relative to both plates, aligned holes in said front and back plates relatively adjacent the second end of said suspension member for receiving a cylindrical object such as a pencil for supporting said scale, at least one face of said body having a protuberance thereon for engagement with a corresponding hole for resiliently retaining said suspension member substantially in alignment with said body.

4. A scale as set forth in claim 1 wherein said body in the vicinity of said weight means is thickened to a predetermined thickness and wherein said suspension member has substantially said predetermined thickness and in said substantially aligned position is disposed adjacent to said thickened vicinity.

* * * * *